(12) United States Patent
Osterberg et al.

(10) Patent No.: US 7,165,806 B2
(45) Date of Patent: Jan. 23, 2007

(54) VEHICLE ROOF STRUCTURE

(75) Inventors: Gary Osterberg, Hartland, MI (US); Robert Blanchard, Fenton, MI (US)

(73) Assignee: Nissan Technical Center North America MI (US)

( * ) Notice: Subject to any disclaimer, the term of this patent is extended or adjusted under 35 U.S.C. 154(b) by 0 days.

(21) Appl. No.: 11/074,830

(22) Filed: Mar. 9, 2005

(65) Prior Publication Data

US 2006/0202520 A1  Sep. 14, 2006

(51) Int. Cl.
  *B60J 7/00* (2006.01)
(52) U.S. Cl. .................. 296/203.03; 296/210
(58) Field of Classification Search ........... 296/203.03, 296/210
  See application file for complete search history.

(56) References Cited

U.S. PATENT DOCUMENTS

| 1,768,368 | A | * | 6/1930 | Menzies | 296/210 |
| 4,311,744 | A | * | 1/1982 | Watanabe | 428/83 |
| 5,318,338 | A | * | 6/1994 | Ikeda | 296/210 |
| 5,671,968 | A | * | 9/1997 | Masuda et al. | 296/187.12 |
| 5,681,076 | A |  | 10/1997 | Yoshii |  |
| 5,873,618 | A |  | 2/1999 | Ejima |  |
| 6,962,389 | B2 | * | 11/2005 | Katsuma | 296/187.12 |
| 2001/0033096 | A1 | * | 10/2001 | Hanyu | 296/203.01 |

* cited by examiner

*Primary Examiner*—Dennis H. Pedder
(74) *Attorney, Agent, or Firm*—Global IP Counselors

(57) ABSTRACT

A vehicle roof structure is disclosed that includes a center roof rail, a pair of center roof rail braces and a pair of inner side roof rail panels. The center roof rail supports a midportion of a vehicle roof. The pair of center roof rail braces has first and second ends with the first end of the center roof rail braces being directly bonded to opposite free ends of the center roof rail. The pair of inner side roof rail panels is each configured to form a portion of a vehicle side roof rail on opposite lateral sides of the vehicle roof structure. An inboard side of each of the inner side roof rail panels is directly bonded to the second ends of the center roof rail braces, respectively, without bonding the center roof rail to the inner side roof rail panels.

22 Claims, 21 Drawing Sheets

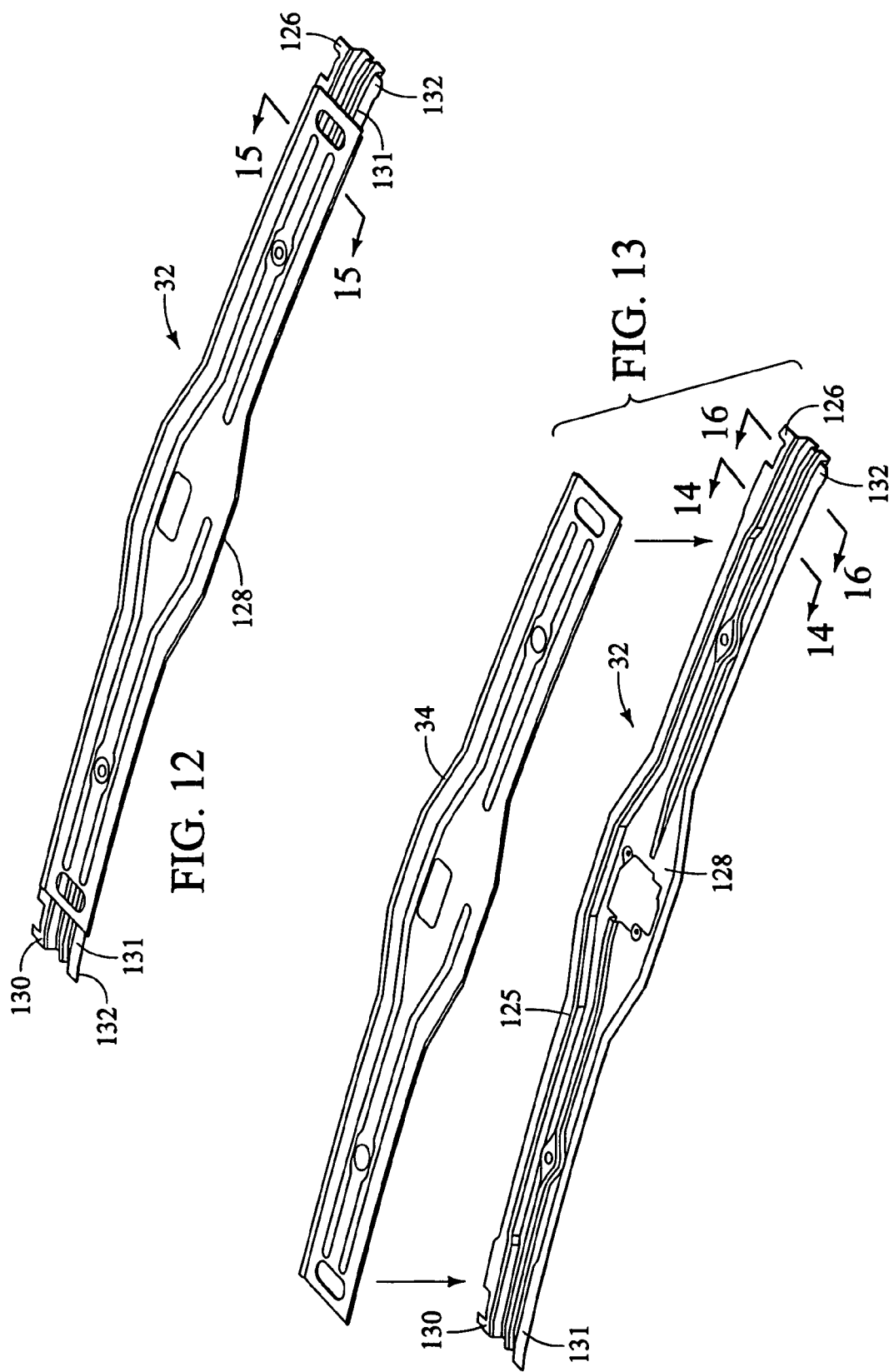

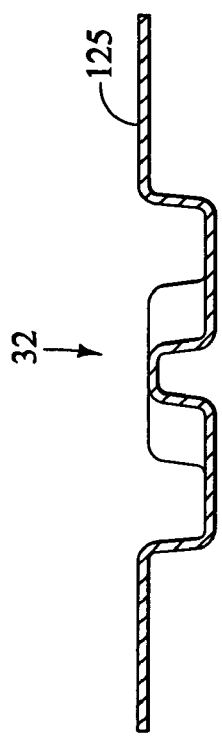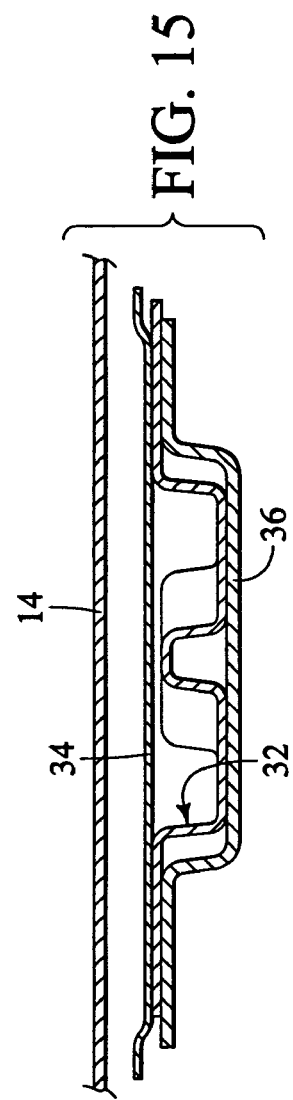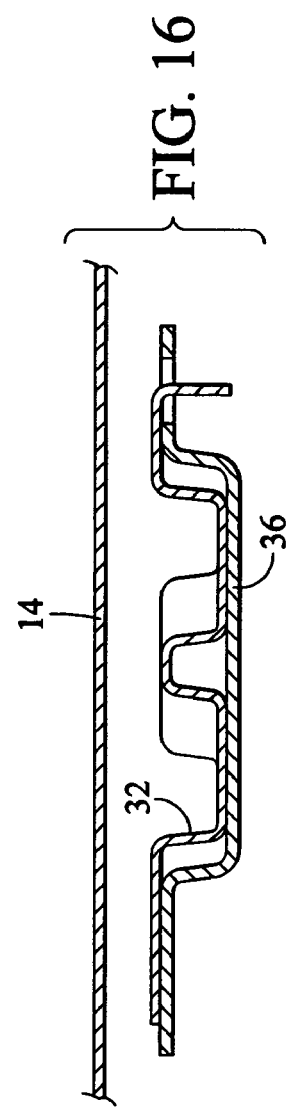

VEHICLE ROOF STRUCTURE

BACKGROUND OF THE INVENTION

1. Field of the Invention

The present invention generally relates to a vehicle roof structure. More specifically, the present invention relates to a connection between a center roof rail of the vehicle roof structure and an inner side roof rail of the vehicle roof structure.

2. Background Information

Many vehicles utilize a conventional unitized (self-supporting) vehicle body that is built from hollow sheet metal components onto which body panels are welded. Generally, the structural configurations of these unitized vehicle bodies are continuously being improved for a variety of reasons. For instance, these unitized vehicle bodies have been developed so as to simplify the assembly process, and thereby reducing manufacturing costs. Moreover, these unitized vehicle bodies have been extensively redesigned over the years to make the vehicles safer in order to protect passengers in the event of an accident.

It is therefore important for a vehicle roof support structure to be simple to manufacture and provide strength and rigidity to protect passengers in the event of impact from the side. One measure of the strength and rigidity of the roof support structure is the offset deformable barrier tests (ODB).

The inner side roof rail of a vehicle is typically a support member that supports a center roof rail that in turn supports a central portion of a vehicle roof. In conventional roof support structures, the center roof rail is typically fixed directly to the inner side roof rail. The connection between the inner side roof rail and the center roof rail has several drawbacks. First, it requires that the inner side roof rail be formed with structure that allows for connection to the center roof rail. This structure can create a discontinuity in the inner side roof rail and be a weak point in the roof support structure. Further, such structure can add cost to the manufacturing process.

In view of the above, it will be apparent to those skilled in the art from this disclosure that there exists a need for an improved vehicle roof structure. This invention addresses this need in the art as well as other needs, which will become apparent to those skilled in the art from this disclosure.

SUMMARY OF THE INVENTION

It has been discovered that in the construction and manufacture of a roof support structure in a vehicle, structural design changes can improve the strength of the roof support structure and reduce manufacturing costs.

It is therefore an object of the present invention to improve the strength and rigidity of a roof support structure in a vehicle, thereby making the vehicle safer.

It is also an object of the present invention to reduce the cost of manufacturing a roof support structure in a vehicle.

Accordingly, one aspect of the present invention is to provide a vehicle roof structure that includes a center roof rail, a center roof rail brace and an inner side roof rail panel. The center roof rail is configured to support a mid-portion of a vehicle roof. The center roof rail brace has first and second ends with the first end of the center roof rail brace being directly bonded to a free end portion of the center roof rail. An inner side roof rail panel is configured to form a portion of a vehicle side roof rail on a first lateral side of the vehicle roof structure. An inboard side of the inner side roof rail panel is directly bonded to the second end of the center roof rail brace without bonding the center roof rail to the inner side roof rail panel.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 12 is a perspective view of the center roof rail shown removed from the roof support structure, in accordance with the present invention;

FIG. 13 an exploded perspective view of the center roof rail showing center roof rail and a reinforcement member in accordance with the present invention;

FIG. 14 is a cross sectional view of the center roof rail as seen along section line 14—14 in FIG. 13, in accordance with the present invention;

FIG. 15 is a cross sectional view of the center roof rail corresponding to a line 15—15 in FIG. 13, showing the center roof rail and the reinforcement member, with the roof and the center roof rail brace added, in accordance with the present invention;

FIG. 16 is a cross sectional view of the center roof rail as seen along section line 16—16 in FIG. 13, showing the center roof rail, the reinforcement member and the roof, in accordance with the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
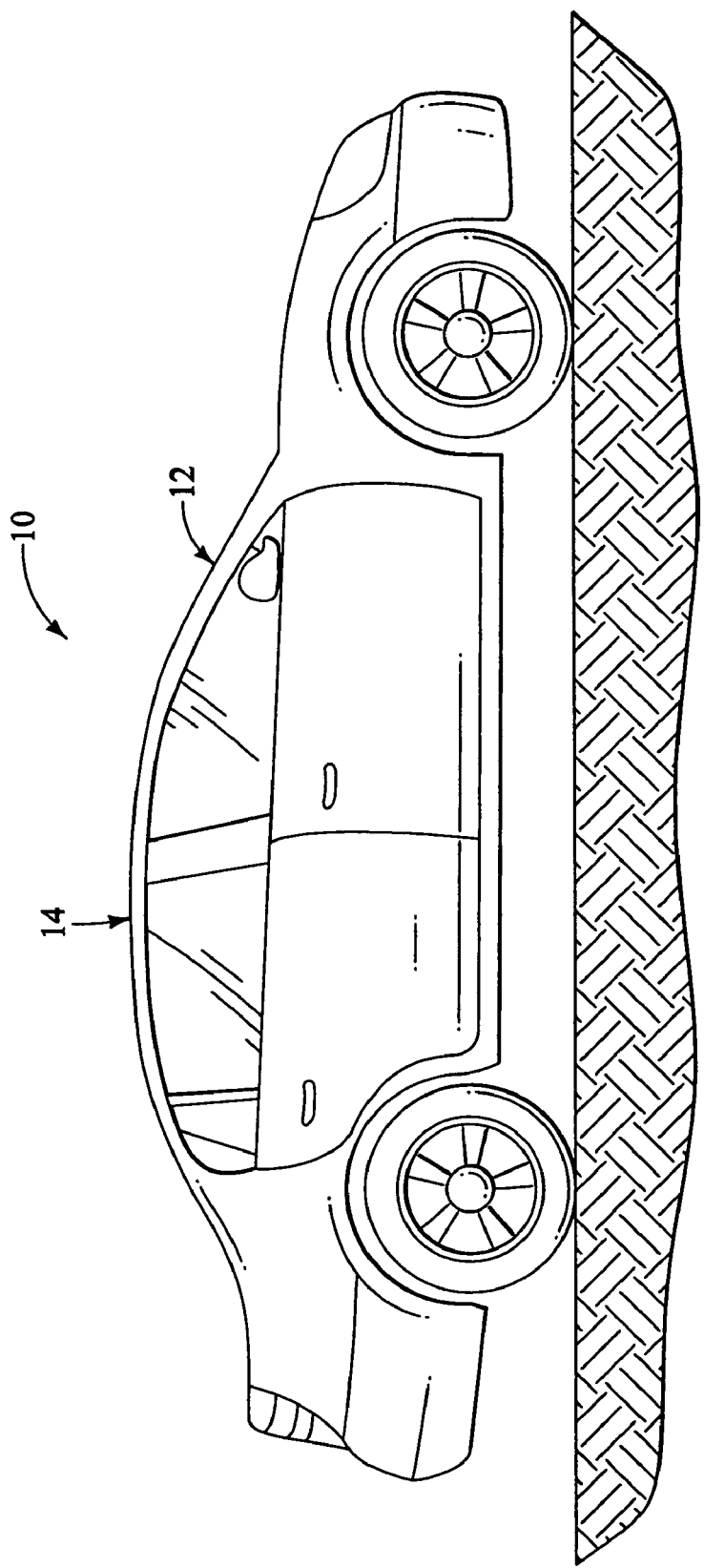
FIG. 1 is a side elevational view of a vehicle that includes a roof support structure in accordance with the present invention.

Referring initially to FIG. 1, a vehicle 10 is illustrated that is equipped with a roof support structure 12 in accordance with a first embodiment of the present invention. The roof support structure 12 of the present invention provides improved strength and rigidity in offset deformable barrier tests (ODB) as compared to conventional roof support structures, as will be apparent to those skilled in the art from the drawings and description below. It should be understood that portions of the vehicle 10 that assist in understanding the present invention are described below. However, descriptions of various conventional portions of the vehicle 10, such as non-roof related body structure, suspension, drive train, etc., are omitted for brevity.

Figure 2:
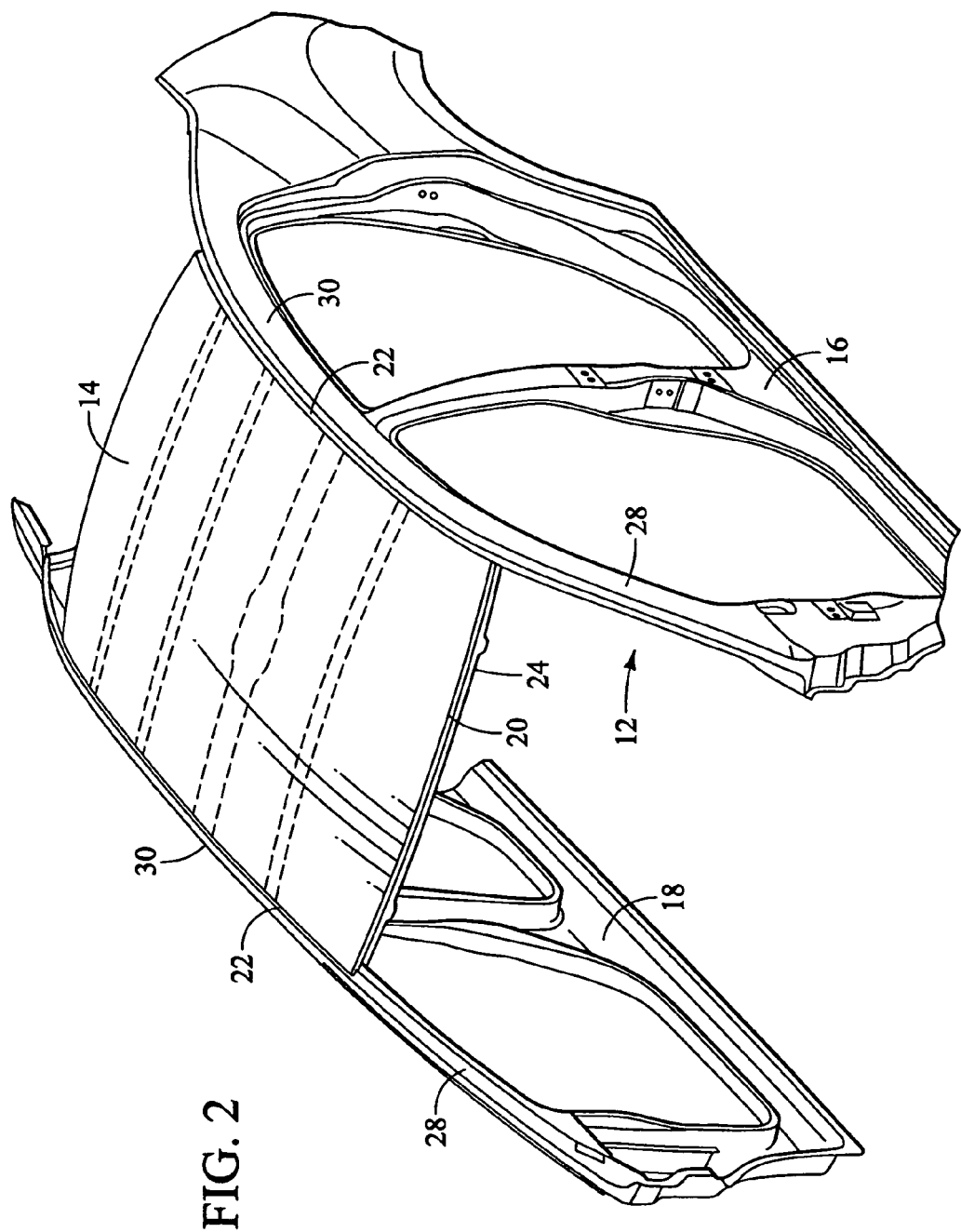
FIG. 2 is a perspective view of selected portions of the vehicle body depicted in FIG. 1, with portions of the vehicle removed to show features of a unibody structure of the vehicle in accordance with the present invention.

As shown in FIG. 2, the roof support structure 12 supports a vehicle roof 14 that is coupled to a pair of side body portions 16 and 18. The vehicle 10 is preferably formed with a unibody construction, but can alternatively be constructed using any of a variety of other conventional construction techniques. As will be understood in the following description, various elements and sections of the roof support structure 12 also form an upper portion of each of the first and second side body portions 16 and 18.

As shown in FIG. 2, the vehicle roof 14 is basically a panel with a slightly curved contour that includes a front attachment portion 20 and a pair of side attachment portions 22. As described in greater detail below, the front attachment portion 20 and the side attachment portions 22 are preferably fixed to specific portions of the roof support structure 12 by welding techniques, such as spot welding.

Figure 3:
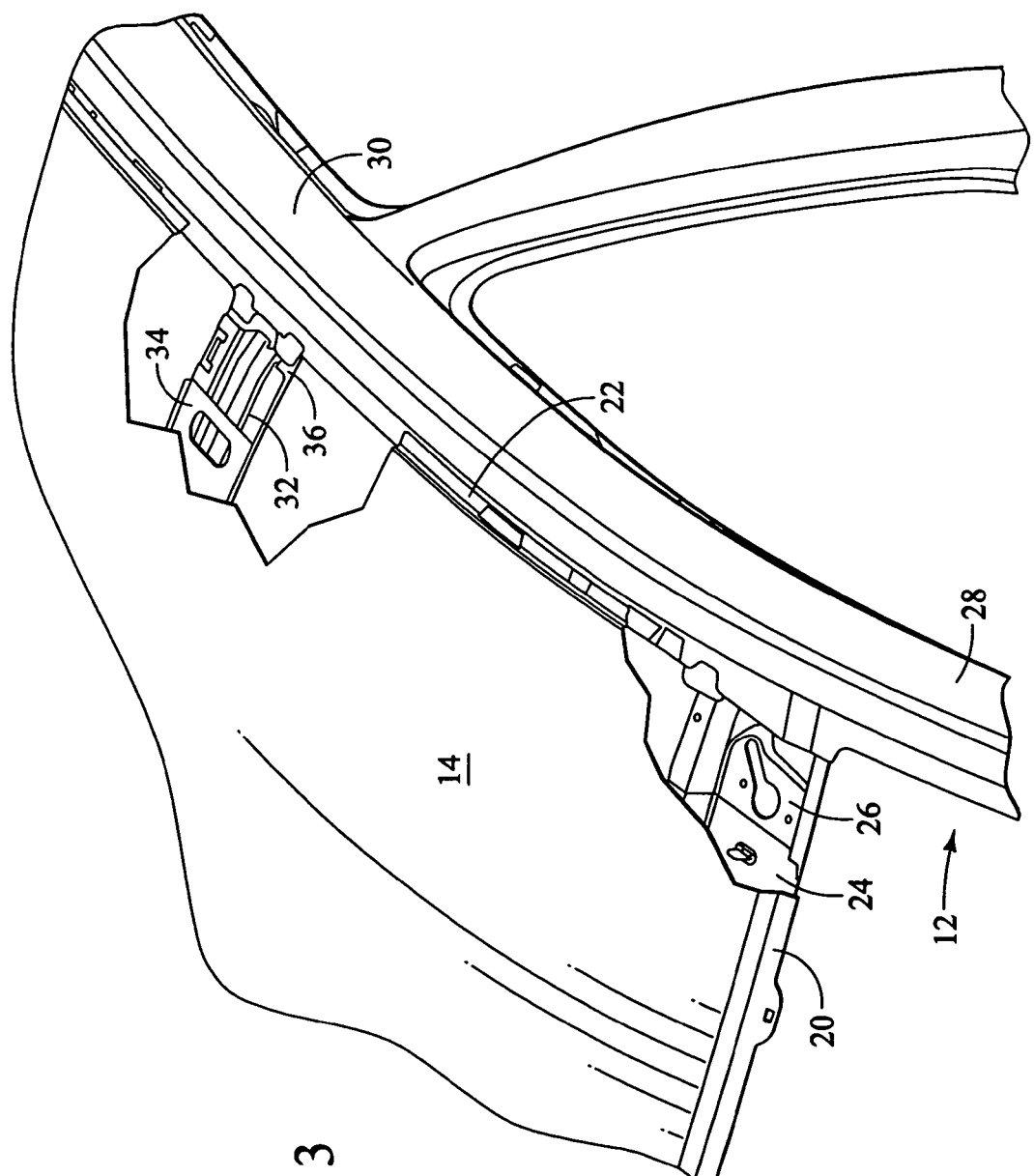
FIG. 3 is an enlarged perspective view, similar to FIG. 2, of a portion of the roof support structure with a parts cutaway to reveal features of the roof support structure in accordance with the present invention.
Figure 4:
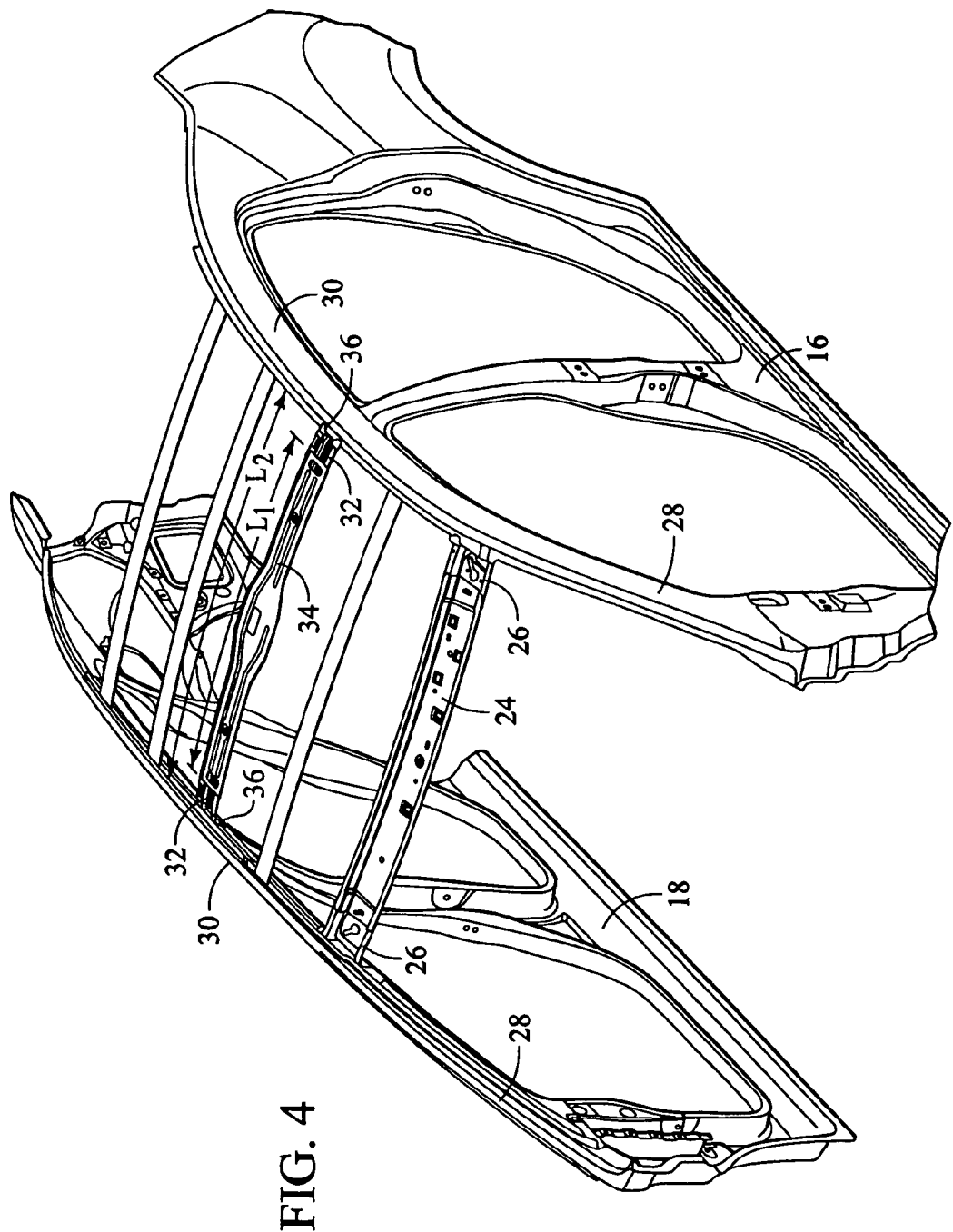
FIG. 4 is a perspective view, similar to FIG. 2, of selected portions of the vehicle body with the roof completely removed to show features of the roof support structure, including a front roof rail, a pair of front roof rail braces, a pair of center roof rail braces and a center roof rail in accordance with the present invention.

As shown in FIGS. 3 and 4, the roof support structure 12 further includes, among other things, a front roof rail 24, a pair front roof rail braces 26 (only one shown in FIG. 3), a pair of A-pillars 28, a pair of side roof rails 30, a center roof rail or bow 32, a center roof rail reinforcement member 34 and a pair of center roof rail braces 36.

Figure 5:
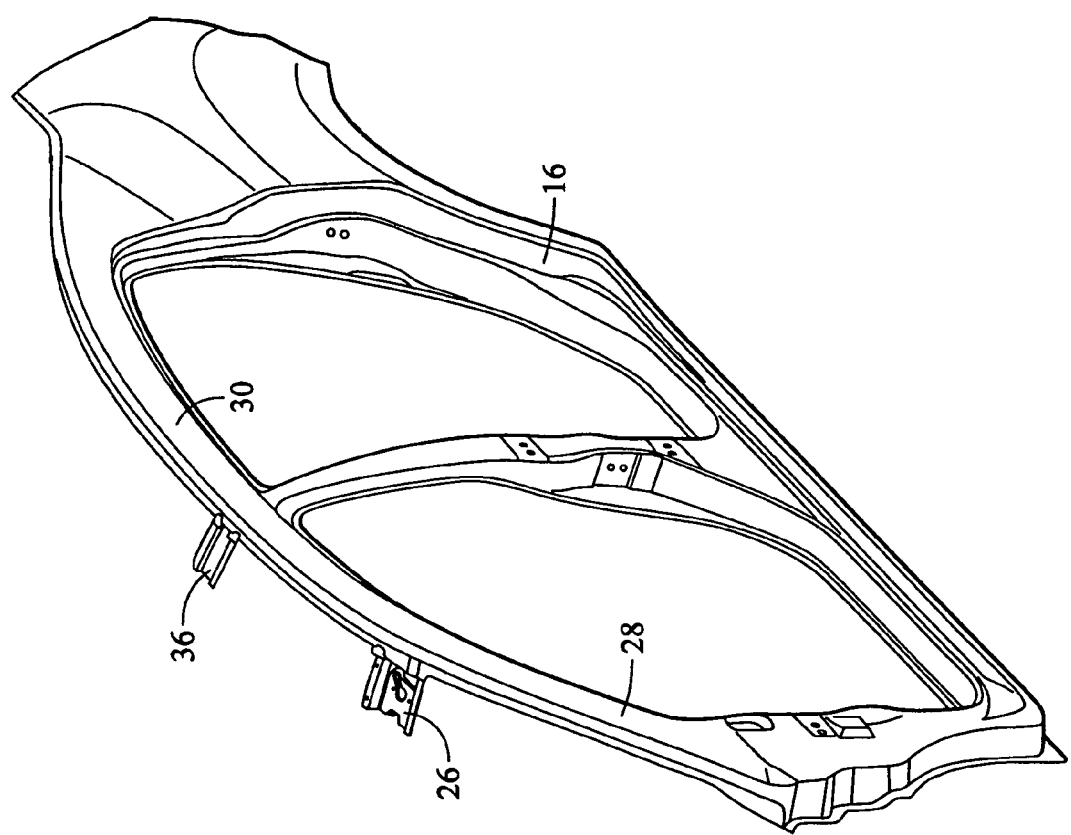
FIG. 5 is a perspective view of a first side body portion of the vehicle that includes portions of the roof support structure, such as one of the front roof rail braces and one of the center roof rail braces, with other portions of the roof rail structure removed to provide greater clarity in accordance with the present invention.
Figure 6:
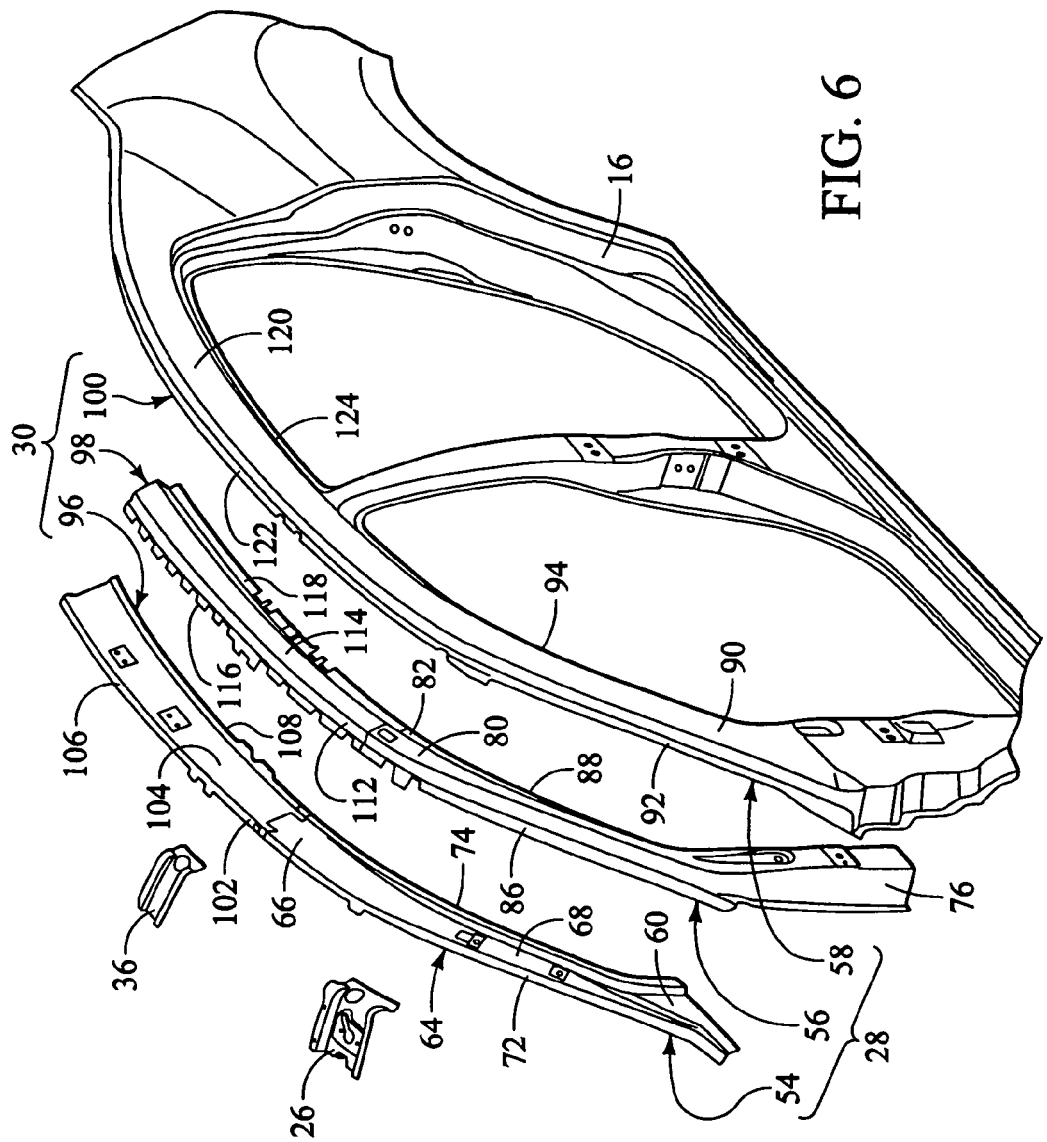
FIG. 6 is an exploded perspective view of the first side body portion of the vehicle, basically showing various elements depicted in FIG. 5 separated from one another to provide greater clarity, in accordance with the present invention.

FIG. 5 shows the first side body portion 16 removed from the vehicle 10 and the fixed attachment relationships between one of the A-pillars 28 and one of the front roof rail braces 26, and between one of the side roof rails 30 and one of the center roof rail braces 36. FIG. 6 is an exploded view of the first side body portion 16 showing the separate elements that form portions of the roof support structure 12. Specifically, FIG. 6 shows one of the A-pillars 28, one of the side roof rails 30, one of the front roof rail braces 26 and one of the center roof rail braces 36.

Figure 7:
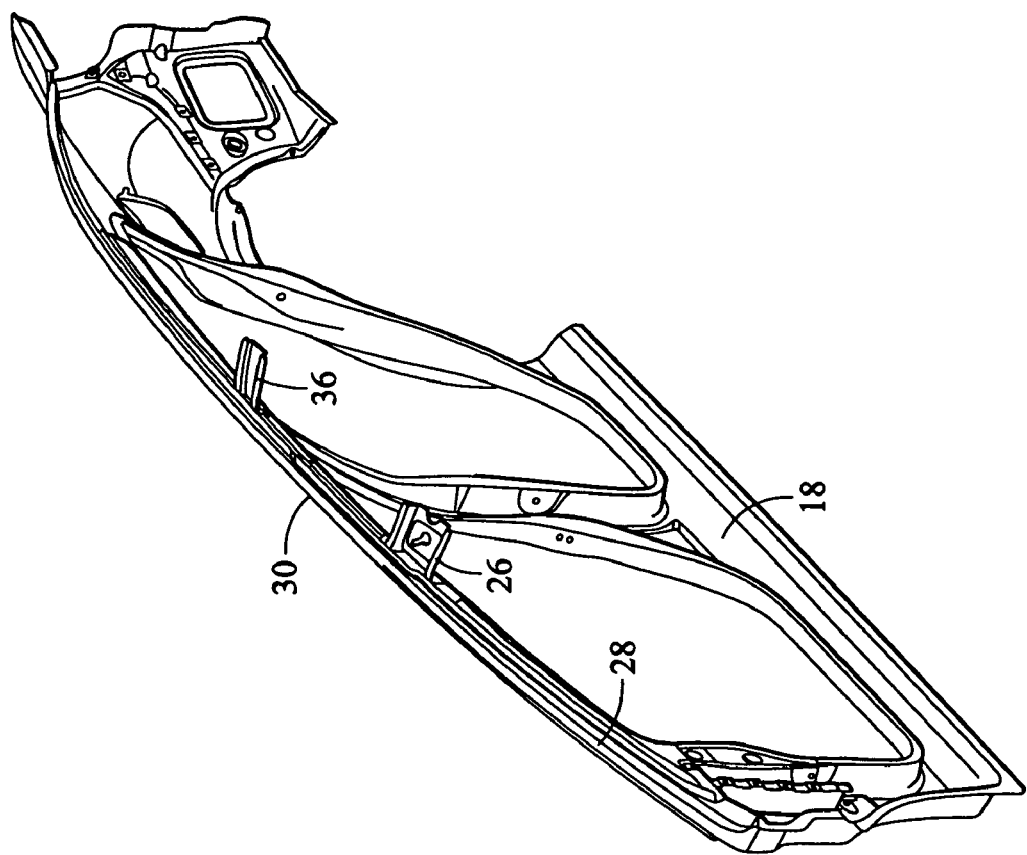
FIG. 7 is a perspective view of a second side body portion of the vehicle that includes portions of the roof support structure, such as the other of the pair of front roof rail braces and the other of the pair of center roof rail braces, with other portions of the roof rail structure removed to provide greater clarity, in accordance with the present invention.
Figure 8:
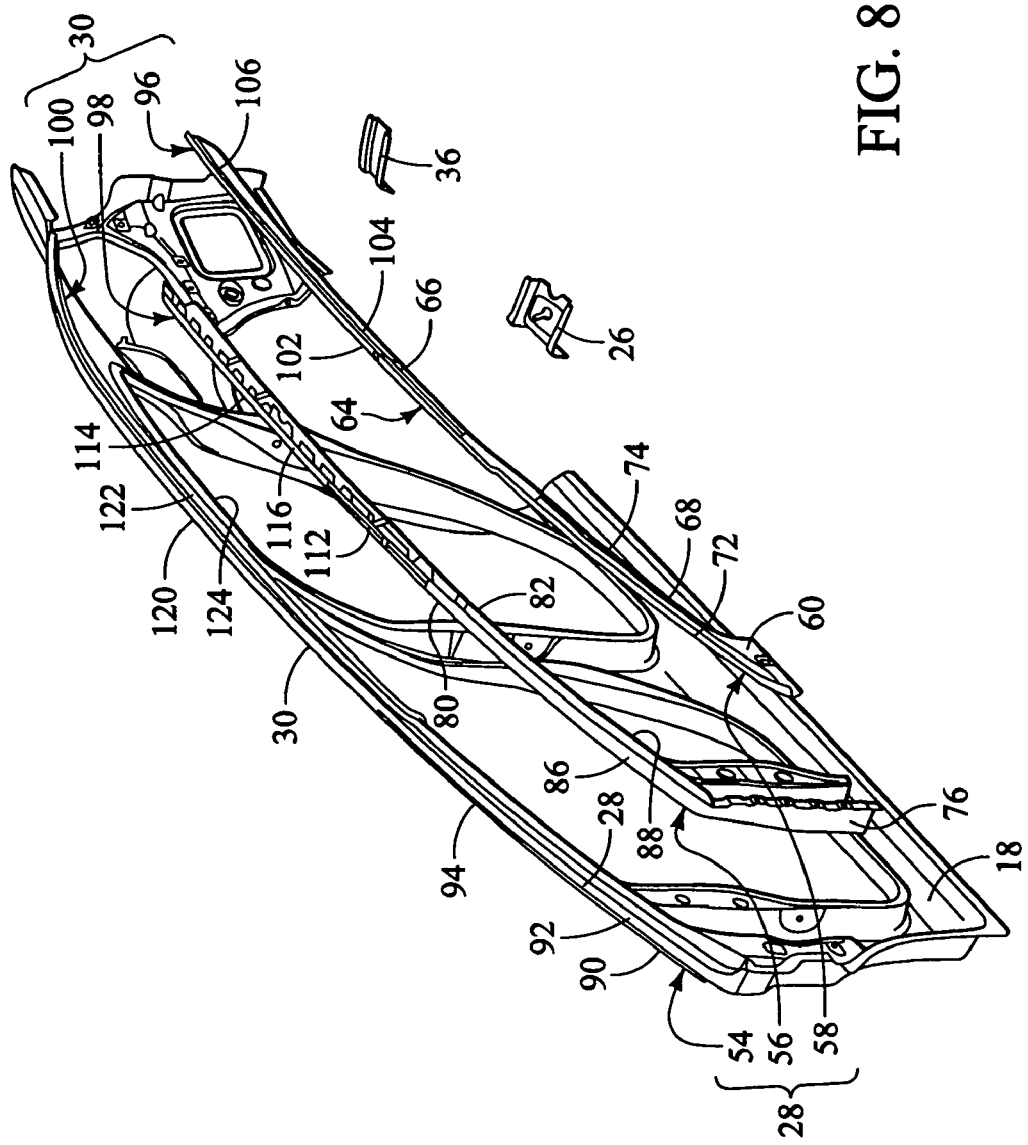
FIG. 8 is an exploded perspective view of the second side body portion of the vehicle, basically showing various elements depicted in FIG. 7 separated from one another to provide greater clarity, in accordance with the present invention.

Similarly, FIG. 7 shows the second side body portion 18 removed from the vehicle 10 and the fixed attachment relationships between the other of the pair of A-pillars 28 and the other of the pair of front roof rail braces 26, and between other of the pair of side roof rails 30 and other of the pair of the center roof rail braces 36. FIG. 8 is an exploded view of the showing the second side body portion 18 showing the separate elements that form the main portions of the roof support structure 12. Specifically, FIG. 8 shows the other of the pair of A-pillars 28, the other of the pair of side roof rails 30, the other of the pair of front roof rail braces 26 and the other of the pair of center roof rail braces 36. As explained further below, the front roof rail braces 26 are welded to respective ones of the A-pillars 28 and the center roof rail braces 36 are welded to respective ones of the side roof rails 30 making strong joints that add rigidity and strength to the roof support structure 12.

As clear from FIGS. 5, 6, 7 and 8, the first body side portion 16 and the second body side portion 18 and respective portions thereof that form the roof support structure 12 are generally mirror images of one another. Description of elements and portions from one of the body side portion applies to the other body side portion. Since the pair of front rail braces 26 are generally mirror images of one another, the description of one front rail brace 26 below is provided for brevity. Similarly, the description below of one of the pair of A-pillars 28, and one of the pair of center roof rail braces 36 is provided for brevity.

Figure 9:
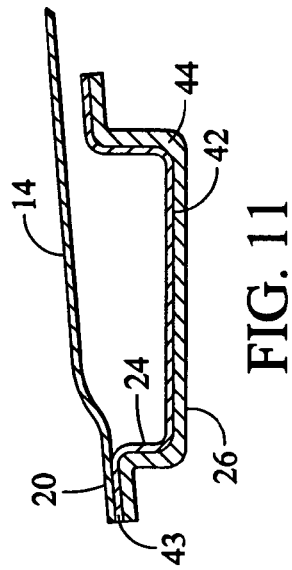
FIG. 9 is a perspective view of the front roof rail of the roof support structure shown removed from the vehicle to provide greater clarity, in accordance with the present invention.
Figure 11:
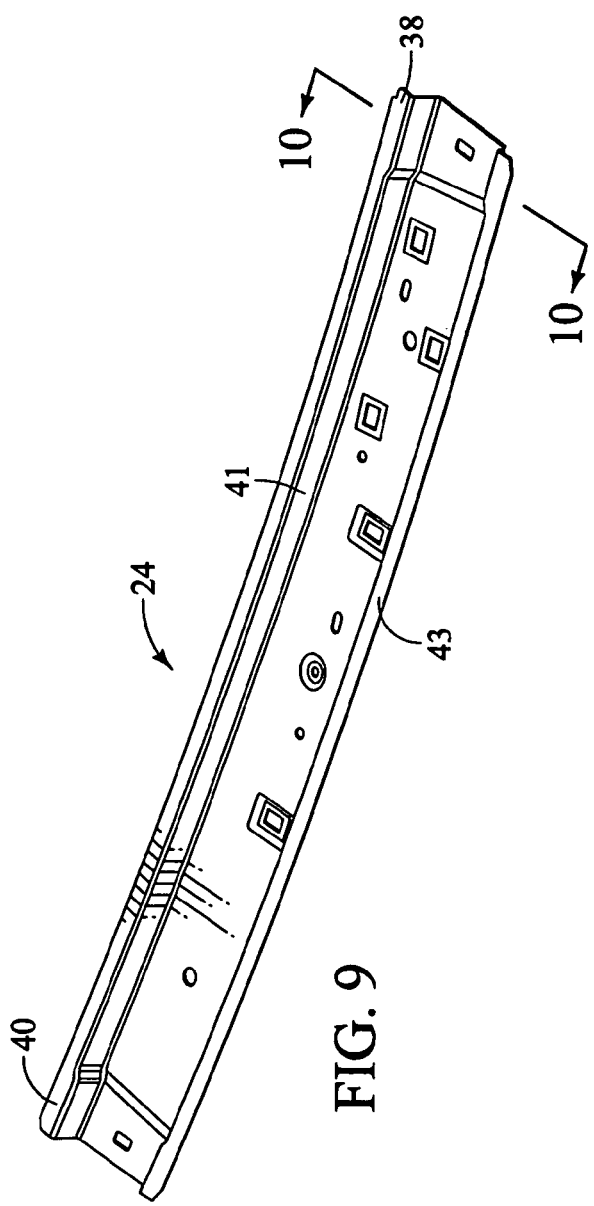
FIG. 11 cross sectional view similar to FIG. 10, that shows details of the contact and bonding between the front roof rail, the front roof rail brace and vehicle roof in accordance with the present invention.
Figure 10:
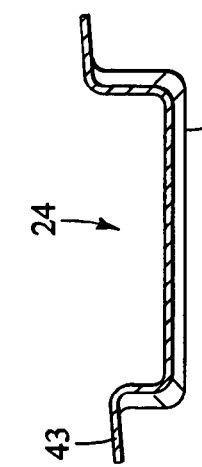
FIG. 10 is a cross sectional view of the front roof rail as seen along section line 10—10 in FIG. 9 in accordance with the present invention.

The front roof rail 24 is shown in FIGS. 9 and 10 as being removed from the vehicle 10 and the roof support structure 12. The front roof rail 24 forms a front portion of the vehicle roof, as shown in FIGS. 2 and 3 with the front attachment portion 20 of the vehicle roof 14 fixedly attached to the front roof rail 24 by, for instance, spot welding techniques. The front roof rail 24 basically includes a first end 38, a second end 40, a mid-portion 41, an underside 42 (see FIGS. 10 and 19) and a front gusset 43. The first and second ends 38 and 40 are fixedly attached to respective ones of the pair of front roof rail braces 26, by for instance, welding techniques. The front roof rail 24 is formed with a generally uniform U-shape, as shown in FIG. 10. However, U-shape of the mid-portion 41 is slightly wider that the U-shape of the first and second ends 38 and 40. Specifically, the first and second ends 38 and 40 of the front roof rail 24 have a slightly narrower U-shaped profile than the mid-portion 41, as indicated in FIG. 9. The front gusset 43 extends the entire length of the front roof rail 24. As shown in FIG. 11, the front attachment portion 20 is boned to the front gusset 43 by, for instance, spot welding or other welding techniques.

Figure 17:
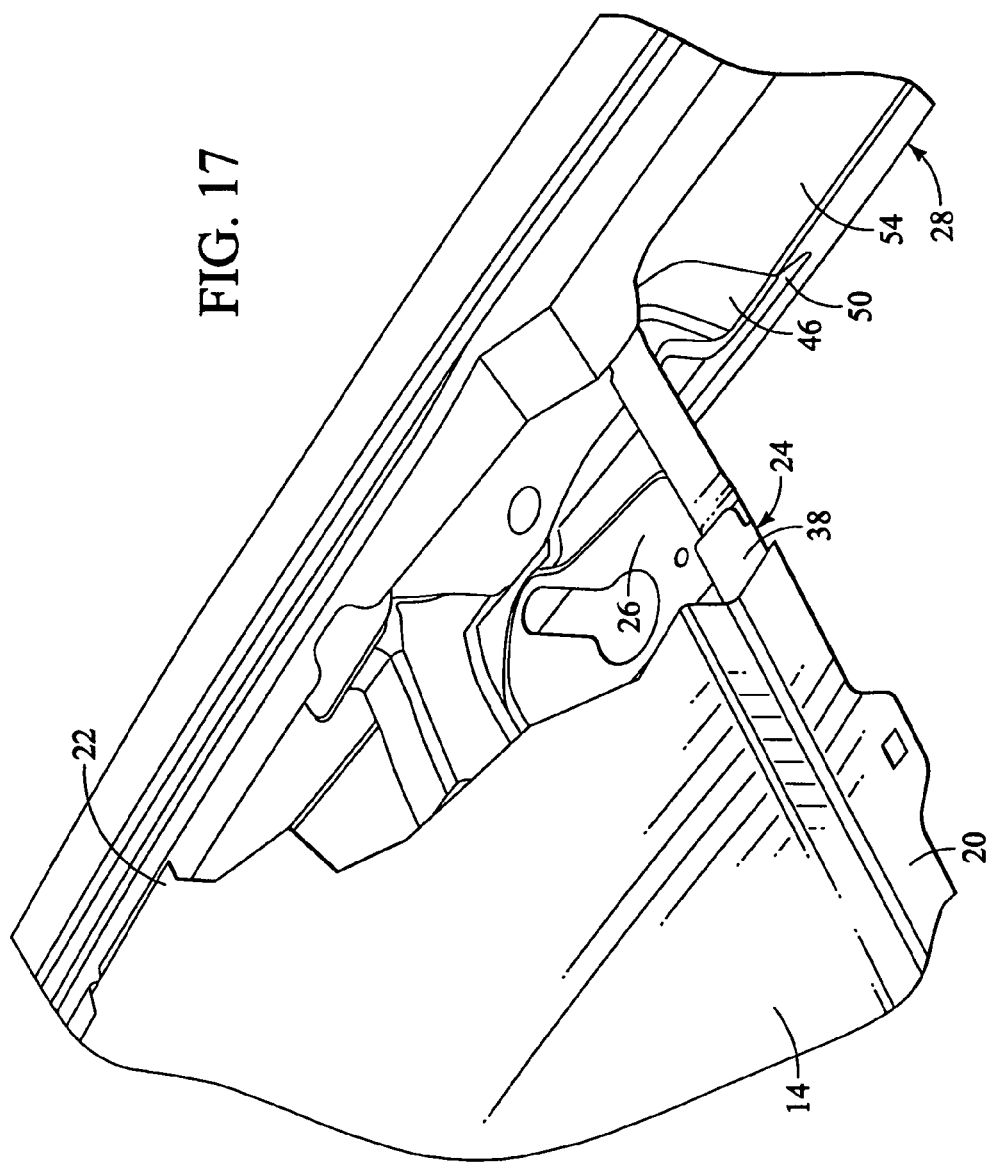
FIG. 17 is a perspective view showing the vehicle roof partially cutaway to reveal details of the front roof rail, the front roof rail brace and the A-pillar, in accordance with the present invention.
Figure 18:
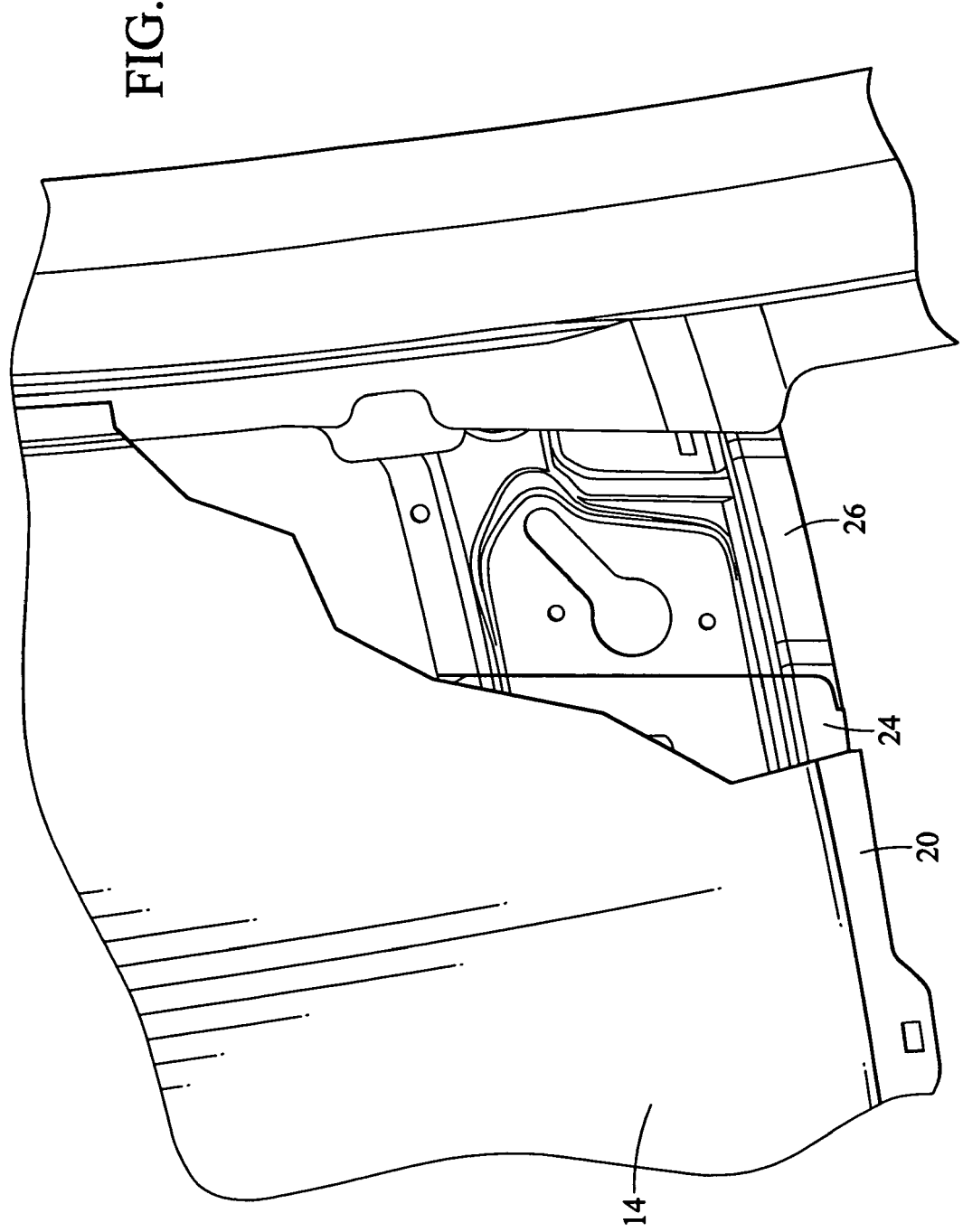
FIG. 18 is another perspective view, from an angle different that in FIG. 17, showing the vehicle roof partially cutaway to reveal details of the front roof rail, the front roof rail brace and the A-pillar, in accordance with the present invention.
Figure 19:
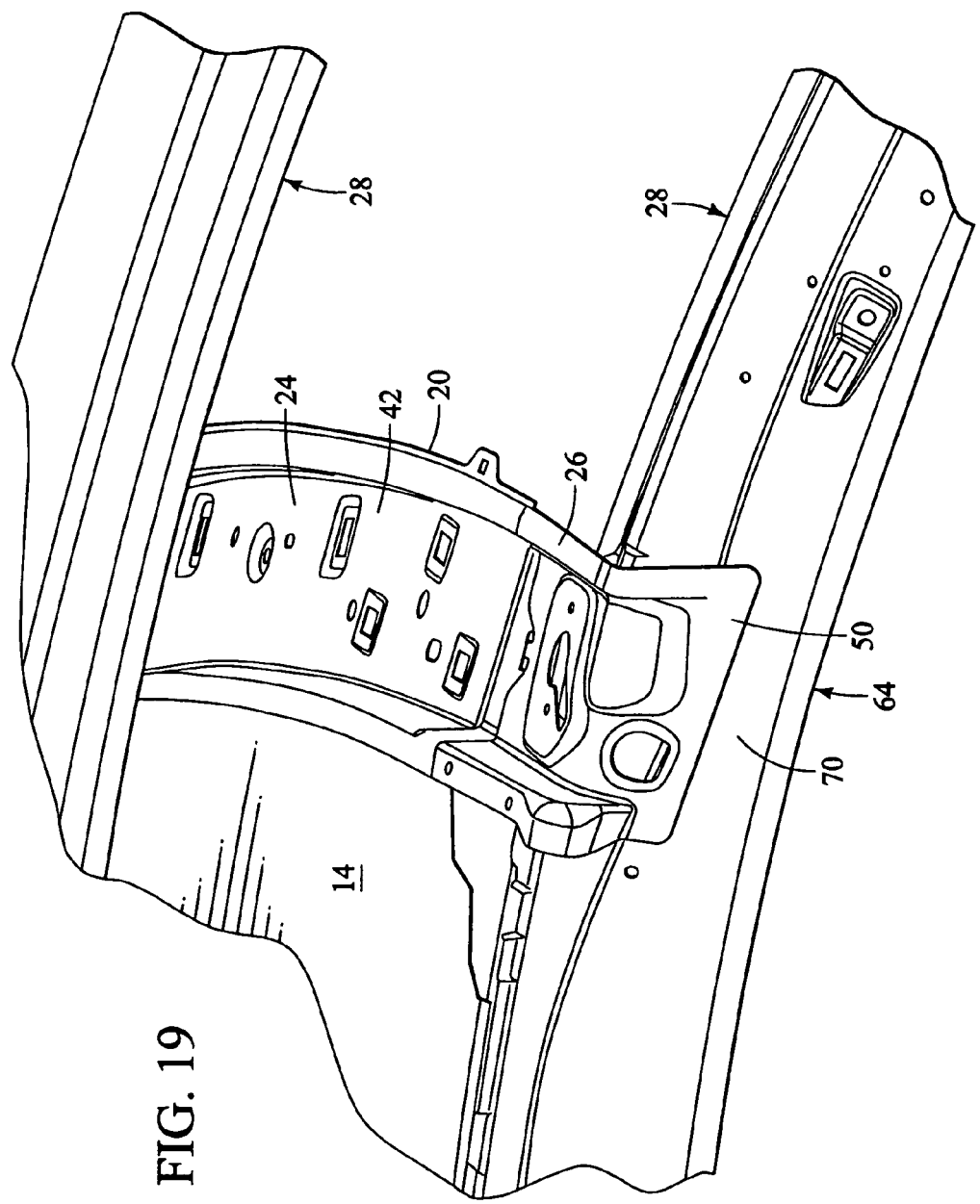
FIG. 19 is yet another perspective view from underneath, showing the vehicle roof partially cutaway and revealing details of the front roof rail, the front roof rail brace and the A-pillar, in accordance with the present invention.
Figure 21:
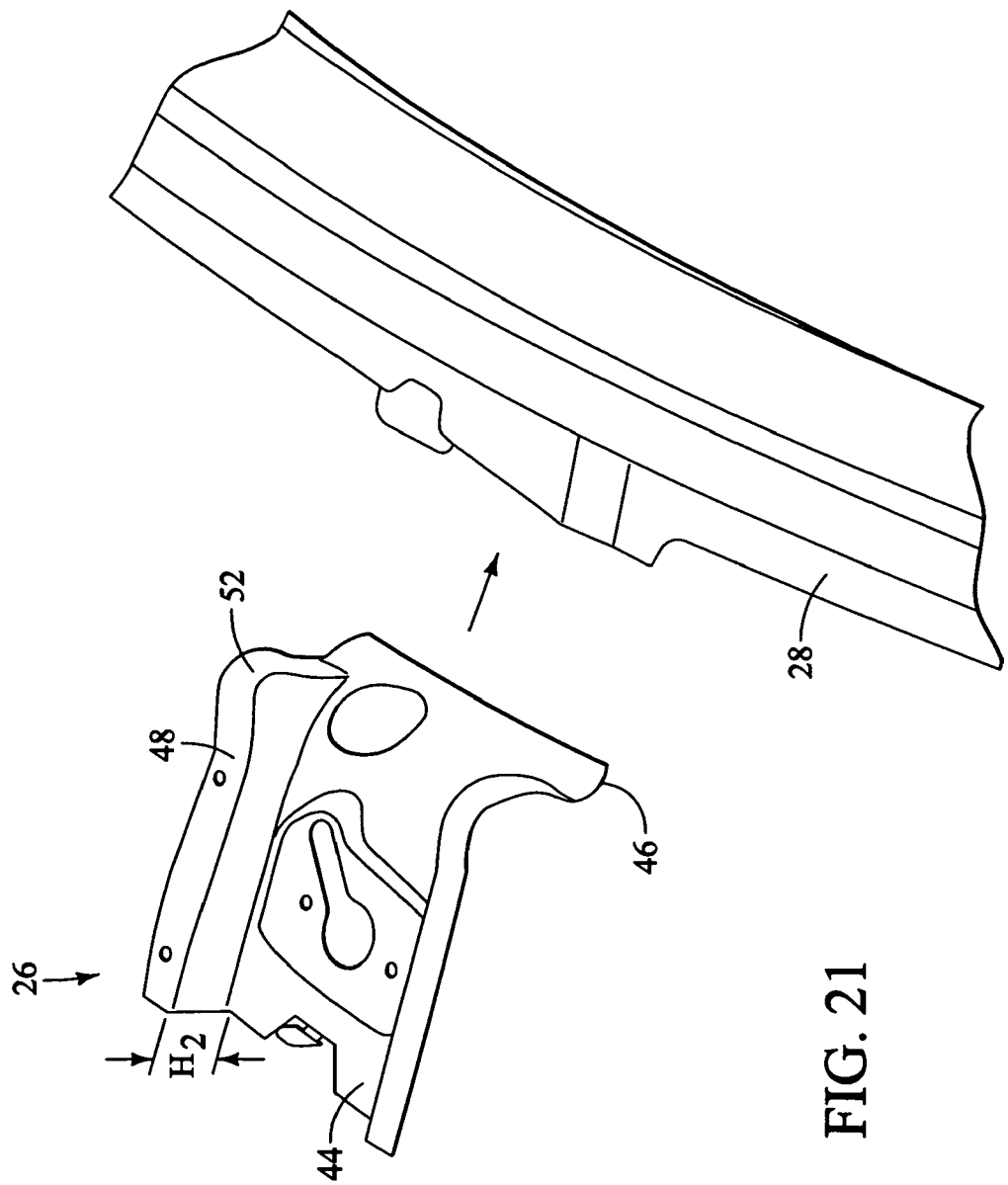
FIG. 21 is an exploded perspective view of a portion of the roof support structure showing the front rail brace and portions of the A-pillar, in accordance with the present invention.
Figure 22:
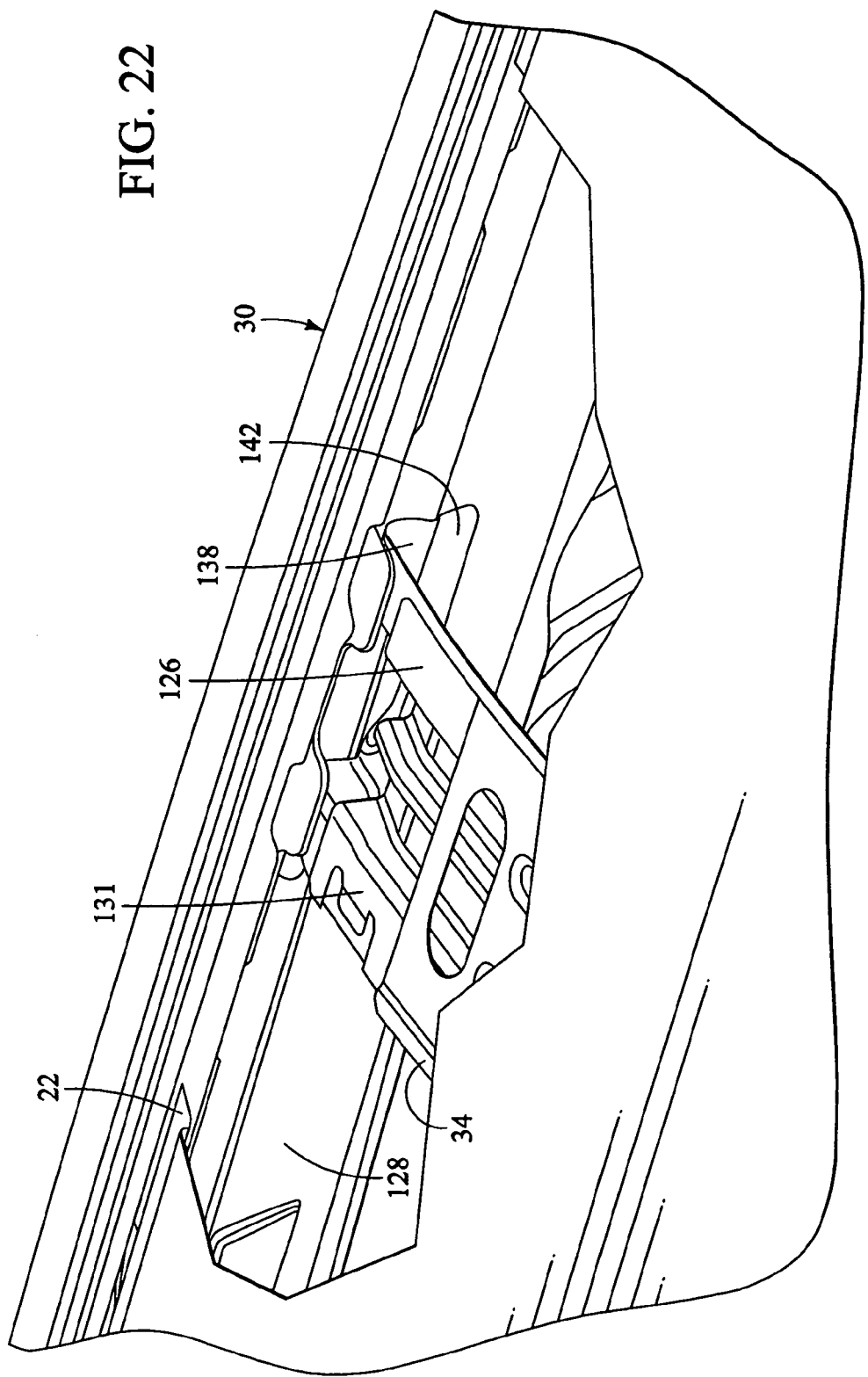
FIG. 22 is a perspective view looking down at the vehicle roof, with portions of the vehicle roof cutaway to show details of the center roof rail, the center roof rail brace and the first side body portion, in accordance with the present invention.
Figure 23:
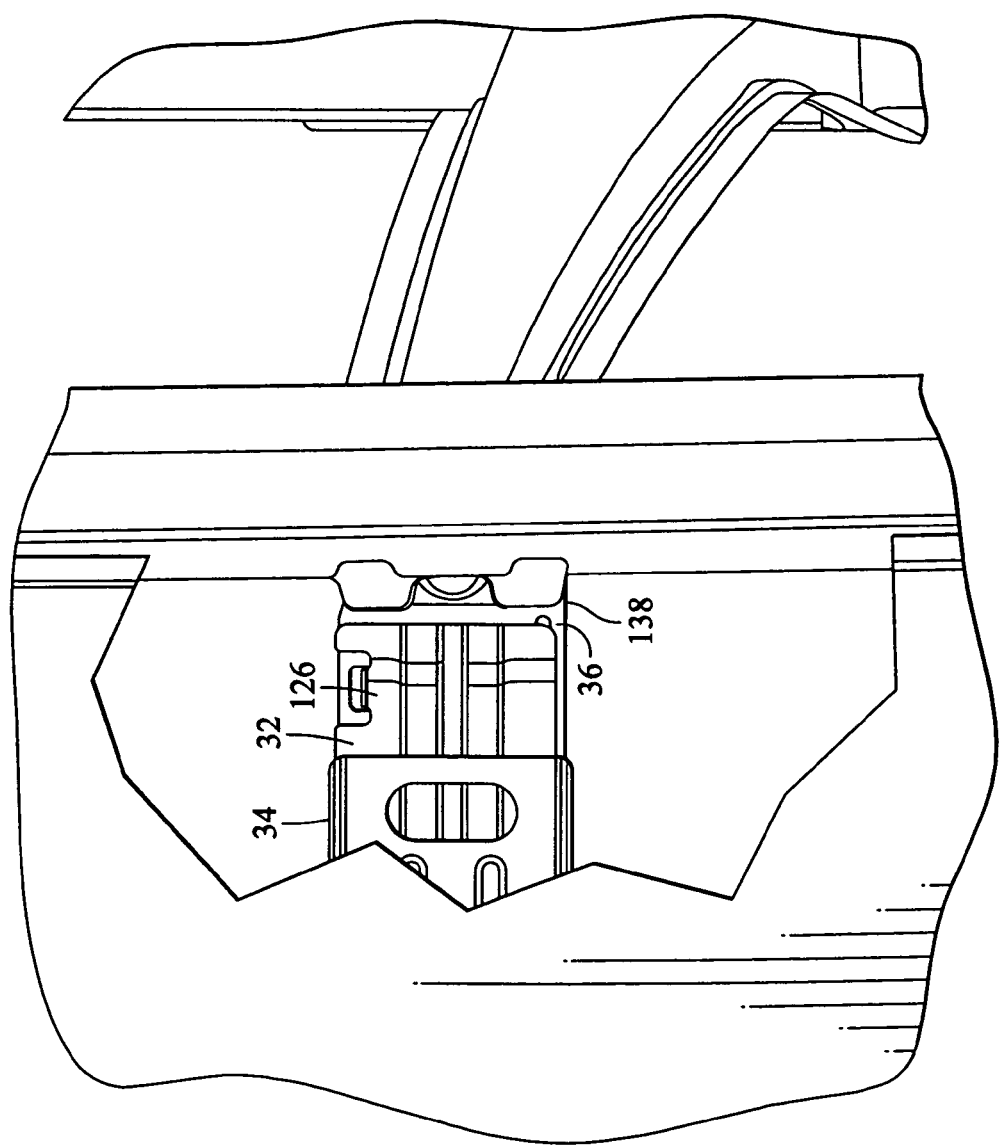
FIG. 23 is a perspective view looking down at the vehicle roof from a slightly different angle than in FIG. 22, with portions of the vehicle roof cutaway to show details of the center roof rail, the center roof rail brace and the first side body portion, in accordance with the present invention.
Figure 24:
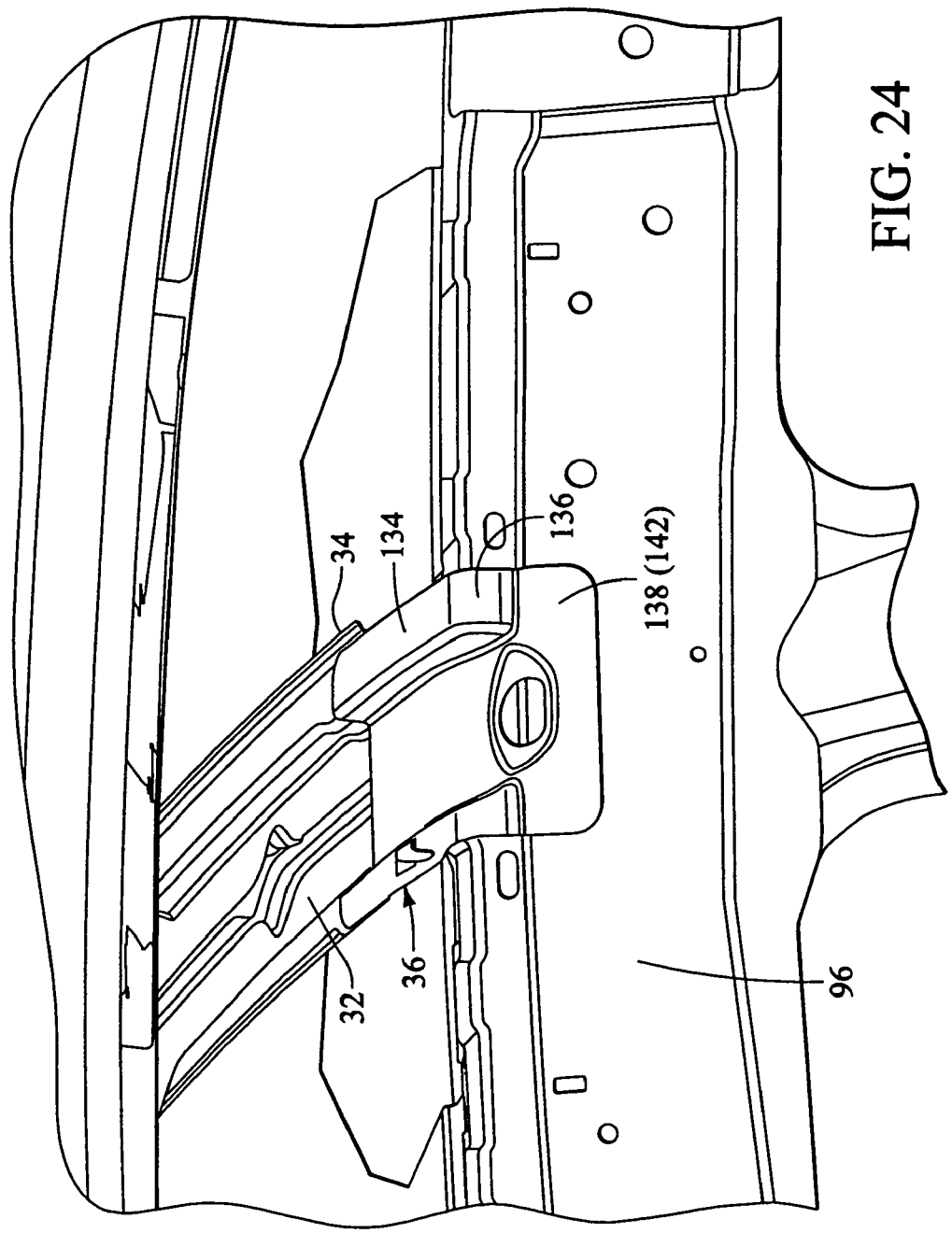
FIG. 24 is yet another perspective view looking upward from within the vehicle at the roof support structure showing the center roof rail, the center roof rail brace and the first side body portion, with portions of the vehicle roof cutaway, in accordance with the present invention.

One of the pair front roof rail braces 26 is shown in FIG. 21. The front roof rail brace 26 includes a first end 44, a second end 46 and a mid-portion 48 extending between the first end 44 and the second end 46. As shown in FIG. 11, the first end 44 of the front roof rail brace 26 has a generally U-shaped transverse cross-section. As shown in FIGS. 17, 18 and 19 the first end 44 is fixedly attached to the underside 42 of the front roof rail 24 at the first end 38 thereof, for example, spot welding techniques.

The U-shaped transverse cross-section of the first end 44 of the front roof rail brace 26 has a configuration that conforms to the U-shaped transverse cross-section of the first end 38 of the front roof rail 24. It should be understood from the drawing and description herein that the other of the pair of front roof rail braces 26 also has a configuration that conforms to the U-shaped transverse cross-section of the second end 40 of the front roof rail 24. Further, as shown in FIG. 20, the front attachment portion 20 of the vehicle roof 14 is directly bond to the front roof rail brace 26 by, for example, spot welding or other welding techniques.

Figure 20:
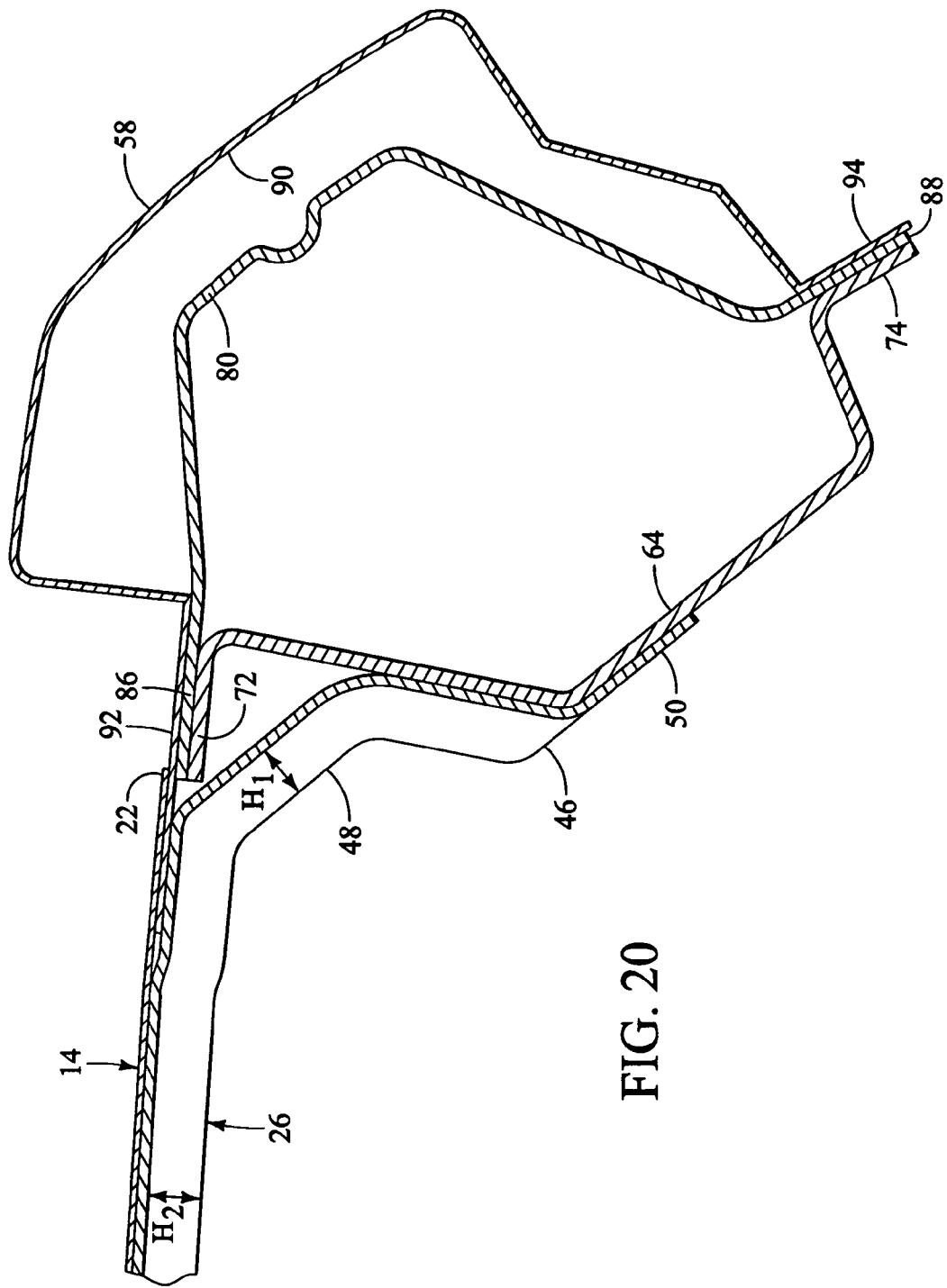
FIG. 20 is a cross sectional view showing the bonding connections between the front roof rail brace, an inner A-pillar portion, a reinforcement portion of the A-pillar and an outer side portion of the vehicle side body, along with the front roof rail and the vehicle roof, in accordance with the present invention.

The second end 46 of the front roof rail brace 26 extends downwardly relative to the first end 44 of the front roof rail brace 26, as shown in FIGS. 19, 20 and 21. The second end 46 includes a generally flat end portion 50 formed at a distal end thereof. The generally flat end portion 50 is fixedly attached to a portion of the A-pillar 28, as described in greater detail below.

The mid-portion 48 of the front roof rail brace 26 has a bent portion 52, as shown in FIGS. 20 and 21. The first end 44 and the mid-portion 48 of the front roof rail brace 26 have generally U-shaped contours. However, the U-shaped contour of the mid-portion 48 at the bent portion 52 has a larger height that the U-shaped contour of the first end 44. Specifically in the bent portion 52, the U-shaped contour defines a height $H_1$ that is larger than a height $H_2$ defined by the U-shaped contour of the first end 44, as shown in FIG. 20. As shown in FIGS. 3 and 4, the front roof rail 24 extends perpendicularly from the A-pillar 28 via the front roof rail brace 26. The configuration of the front roof rail brace 26 provides greater rigidity and strength to the roof support structure 12 as compared to conventional roof structure configurations.

The A-pillar 28 is now described in greater detail with respect to FIG. 6 (and FIG. 8). However it should be understood that the description of the A-pillar 28 also applies to the second of the pair of A-pillars 28 depicted in FIG. 8, which includes like reference numerals. The A-pillar 28 basically includes an inner A-pillar panel 54, a reinforcement portion 56 and an outer side portion 58. The inner A-pillar panel 54, the reinforcement portion 56 and the outer side portion 58 are bonded to one another by, for example, welding techniques to form the A-pillar 28, as shown in cross-section in FIG. 20.

Referring again to FIG. 6, the inner A-pillar panel 54 is basically an elongated member that includes a lower end 60, a mid-portion 62, a connection portion 64 and an upper end 66. Along its length, the inner A-pillar panel 54 is generally formed with a U-shaped contour or transverse cross-section. The U-shaped contour provides the inner A-pillar panel 54 with a concave surface 68 that faces toward an outboard side of the vehicle 10. Specifically, the concave surface 68 confronts the reinforcement portion 56. Also, as shown in FIGS. 3, 17, 18 and 20, the first end 38 of the front roof rail 24 is spaced apart from the inner A-pillar panel 54 due to the respective fixed attachments with the front roof rail brace 26.

With reference again to FIG. 6, at the lower end 60 of the inner A-pillar panel 54 the U-shaped contour diverges toward the distal end thereof. As a result, the lower end 60 gets wider approaching its distal end. Along the mid-portion 62 of the inner A-pillar panel 54, the U-shaped contour is generally uniform, but can get slightly larger extending upward toward the connection portion 64. The connection portion 64 is also formed with a generally constant overall transverse cross sectional that is U-shaped.

The connection portion 64 includes a mid-portion 70 with a generally flat or planar area and first and second bent gusset portions 72 and 74 on opposite sides of the mid-portion 70. As shown in FIGS. 17, 19 and 20, the flat end portion 50 of the second end 46 of the front roof rail brace 26 is bonded to the inward side of the generally flat area of the mid-portion 70 of the connection portion 64. Specifically, the flat end portion 50 is bonded to the mid-portion 70 by, for example, welding techniques, such as spot welding. Therefore, the shape and configuration of the front roof rail brace 26 is such that the generally U-shaped transverse cross-section of the first end 44 of the front roof rail brace 26 is located above the generally flat area of the mid-portion 70 connection portion 64 of the inner A-pillar panel 54.

As should be clear from the drawings, in particular, FIG. 6, at least from proximate the upper end 66 of the inner A-pillar panel 54 through the connection portion 64 is formed with the substantially constant transverse cross section. As shown in FIG. 20, the vehicle roof 14 is directly bonded to the front roof rail braces 26 at an area between the inner A-pillar panels 54 and the opposite ends (first and second ends 38 and 40) of the front roof rail 24.

Returning again to FIG. 6 (and FIG. 8), the reinforcement portion 56 is basically an elongated member that includes a lower end 76, a transition portion 80 and an upper end 82. Along its length, reinforcement portion 56 is generally formed with a U-shaped contour or U-shaped transverse cross-section. The U-shaped contour provides the reinforcement portion 56 with a concave surface 84 (shown in FIG. 8) that faces toward an inboard side of the vehicle 10. Specifically, the concave surface 84 confronts the concave surface 68 of the inner A-pillar panel 54.

At lower end 76 the U-shaped contour deepens toward the distal end thereof. As a result, the lower end 76 extends outwardly with respect to the vehicle 10 approaching its distal end. Along the mid-portion 78 of the reinforcement portion 56, the U-shaped contour is generally uniform, but can get slightly larger extending upward toward the transition portion 80. The transition portion 80 is also formed with a generally constant overall transverse cross sectional that is U-shaped. Specifically, the transition portion 80 includes a generally flat or planar area and first and second bent gusset portions 86 and 88 on opposite sides of the generally flat area.

As indicated in FIG. 6, the lower end 76 of the reinforcement portion 56 extends into a portion of the first side body portion 16 for attachment thereto. The lower end 76 is welded or otherwise bonded to the first side body portion 16 to provide rigidity and strength for the A-pillar 28 within the vehicle 10. As also indicated in FIG. 6 (and FIG. 8), the first and second bent gusset portions 86 and 88 of the reinforcement portion 56 are bonded to the first bent gusset portion 72 and the second bent gusset portion 74, respectively, of the inner A-pillar panel 54.

The outer side portion 58 is formed at an upper area of the first side body portion 16, as shown in FIG. 6. The outer side portion 58 can be a separate element welded to the first side body portion 16, or alternatively can be formed unitarily with the first side body portion 16 as a single element. The outer side portion 58 is formed with a slightly contorted U-shaped contour that includes a U-shaped portion 90, a first gusset portion 92 and a second gusset portion 94. The U-shaped portion 90 forms an outer shell of the A-pillar 28 that is typically finished with paint and other protective coatings.

As shown in FIG. 20, the U-shaped portion 90 is spaced apart from the transition portion 80 of the reinforcement portion 56 to provide further strength and rigidity to the A-pillar 28. The first gusset portion 92 is bonded to the first bent gusset portion 86 of the reinforcement portion 56 by, for example, spot welding or other welding techniques. Similarly, the second gusset portion 94 is bonded to the second bent gusset portion 88 of the reinforcement portion 56 by, for example, spot welding or other welding techniques. Together, the inner A-pillar panel 54, the reinforcement portion 56 and the outer side portion 58 form the A-pillar 28 of the roof support structure 12.

The configuration and various attachments between the A-pillar 28, the front roof rail brace 26 and the front roof rail 24 provide the roof support structure 12 with rigidity and strength that is an improvement over conventional designs.

The side roof rail 30 is now described in greater detail with specific reference to FIGS. 6 and 8. The side roof rail 30 is an elongated member that basically includes an inner roof side rail panel 96, a side reinforcement portion 98 and a side outer portion 100 that are bonded together, by, for example, spot welding or other welding techniques.

The inner roof side rail panel 96 is a U-shaped member that includes a forward portion 102, a central portion 104, a first gusset portion 106 and a second gusset portion 108. The forward portion 102 of the inner roof side rail panel 96 is fixedly attached to the upper end 66 of the inner A-pillar panel 54 by, for example, spot welding techniques or other welding techniques. However, as should be understood from the drawings and description of the present invention that the inner roof side rail panel 96 and the inner A-pillar panel 54 can be unitarily formed as a single member, or can be separate elements welded or otherwise bonded together.

The central portion 104 of the inner roof side rail panel 96 is a generally planar portion that extends the length of the inner roof side rail panel 96. Further, the central portion 104 has an inboard or inward side 110 shown in FIG. 8. The central portion 104 of the inner roof side rail panel 96 is also generally continuous with the mid-portion 70 of the connection portion 64 of the inner A-pillar panel 54. Likewise, the first and second gusset portions 106 and 108 are generally continuous with the first and second bent gusset portions 72 and 74 of the inner A-pillar panel 54. Further, at least the forward portion 102 of the inner side roof rail panel 90 adjacent to the connection portion 64 of the inner A-pillar panel 54 is formed with the generally constant overall transverse cross sectional shape of the connection portion 64 of the inner A-pillar panel 54. Further, the U-shaped contour of inner roof side rail panel 96 in generally continuous with the U-shaped contour at the upper end 66 inner A-pillar panel 54, with some possible dimensional variations.

As shown in FIG. 6, the side reinforcement portion 98 is a U-shaped member that includes a forward portion 112, a central portion 114, a first gusset portion 116 and a second gusset portion 118. The forward portion 112 of the side reinforcement portion 98 is fixedly attached to the upper end 82 of the reinforcement portion 56 by, for example, spot welding techniques or other welding techniques. However, as should be understood from the drawings and description of the present invention that the side reinforcement portion 98 and the reinforcement portion 56 can be unitarily formed as a single member, or can be separate elements welded or otherwise bonded together.

The central portion 114 of the side reinforcement portion 98 extends the length of the side reinforcement portion 98. The central portion 114 and the first and second gusset portions 116 and 118 of the side reinforcement portion 98 are generally continuous with the transition portion 80 of the reinforcement portion 56. Further, the U-shaped contour of inner side reinforcement portion 98 is generally continuous with the U-shaped contour of the transition portion 80 of the reinforcement portion 56 with some possible dimensional variations.

As indicated in FIG. 6 (and FIG. 8), the first and second bent gusset portions 116 and 118 of the side reinforcement portion 98 are bonded to the first and the second gusset portions 106 and 108 of the inner roof rail panel 96, respectively.

Figure 25:
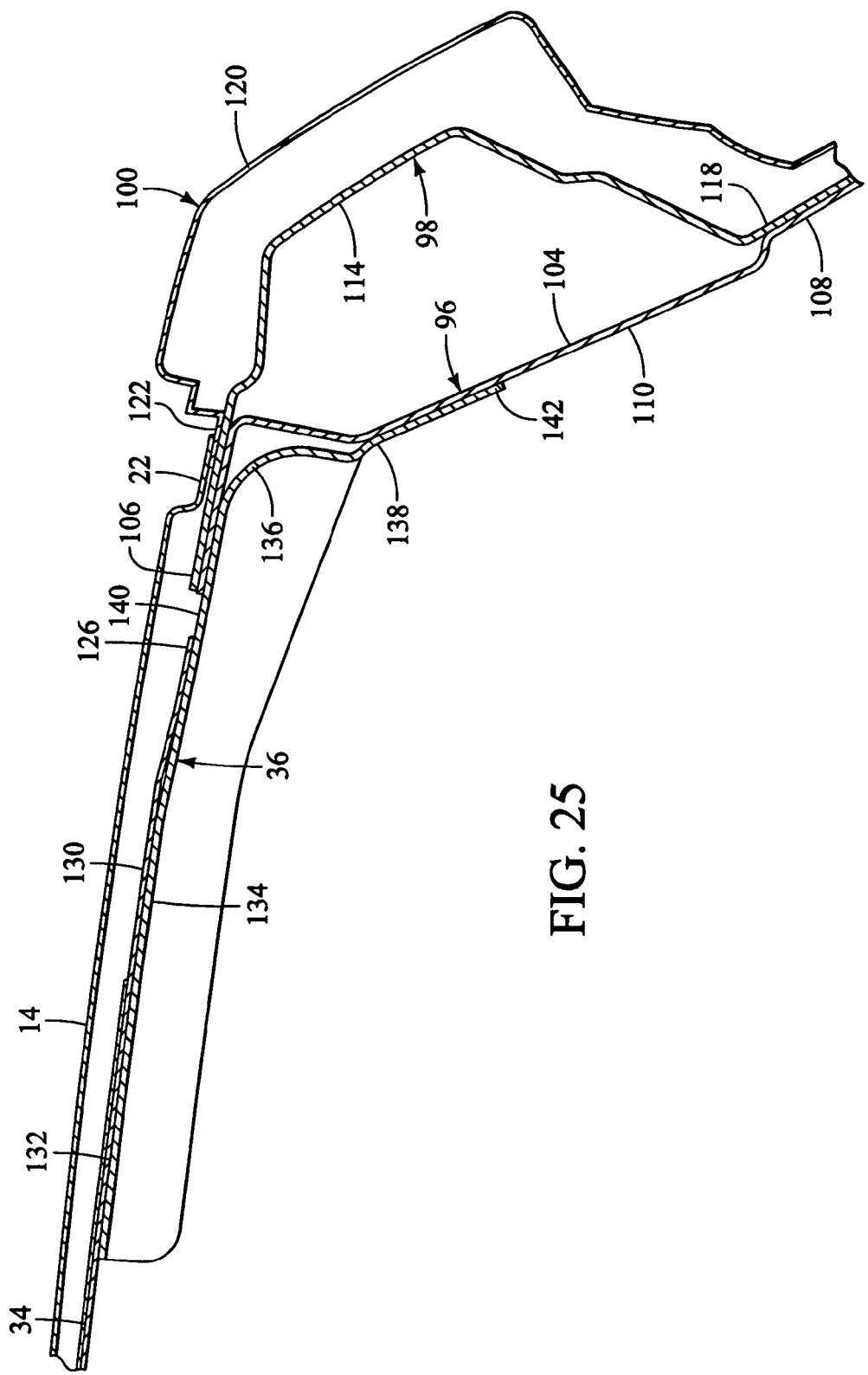
FIG. 25 is a cross sectional view showing the bonding connections between the vehicle roof, the center roof rail brace and portions of a side roof rail, in accordance with the present invention.
Figure 26:
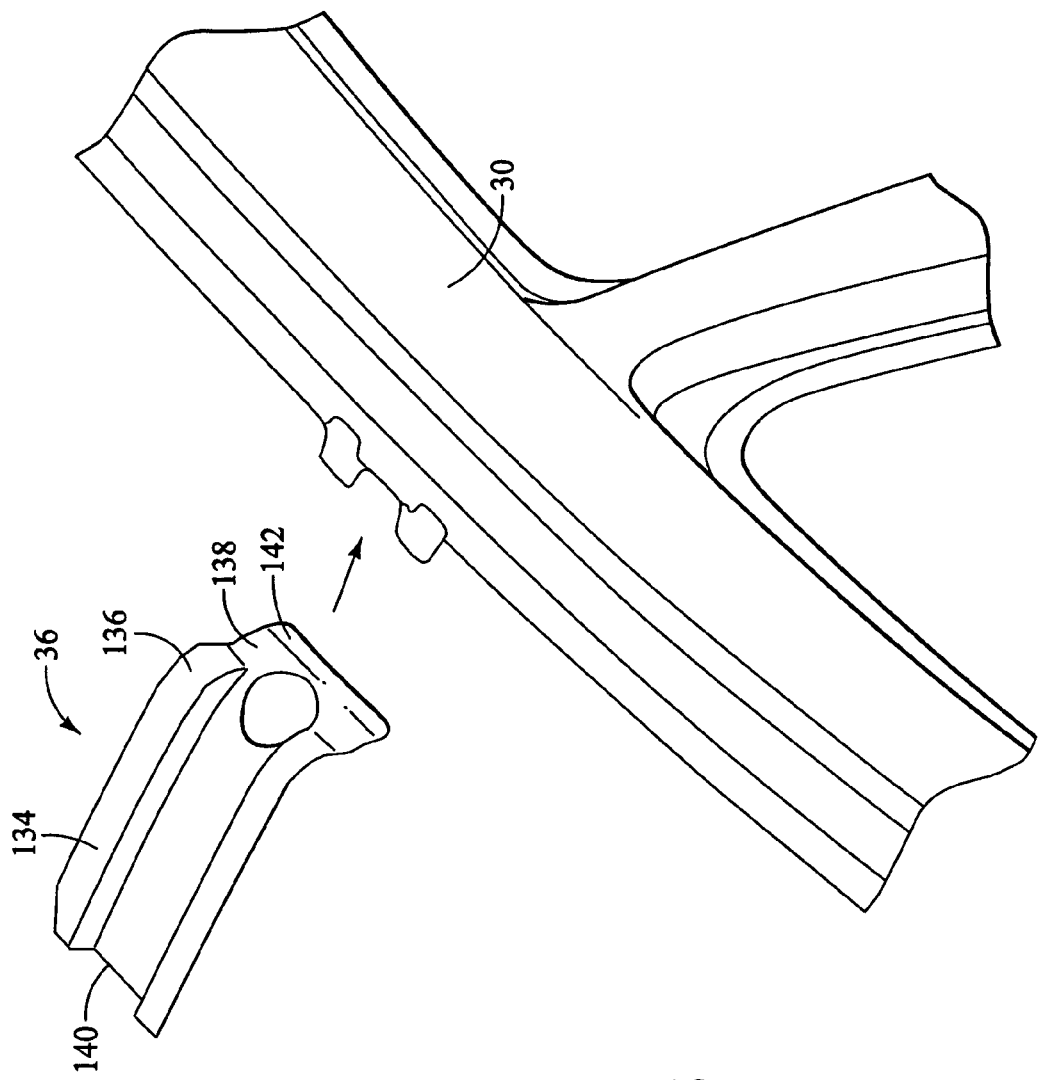
FIG. 26 is a perspective view showing the center roof rail brace and portions of the side roof rail, in accordance with the present invention.

As shown in FIGS. 6, 8 and 25, the side outer portion 100 is formed with a slightly contorted U-shaped contour that includes a U-shaped portion 120, a first gusset portion 122 and a second gusset portion 124. The U-shaped portion 120 forms an outer shell of the side roof rail 30 that is typically finished with paint and other protective coatings. The side outer portion 100 can be a separate element welded to the first side body portion 16. Alternatively, the side outer portion 100 can be formed unitarily with the first side body portion 16 as a single element. The second side body portion 16 and the side outer portion 100 have a similar relationship.

As shown in FIG. 25, the U-shaped portion 120 is spaced apart from the central portion 114 of the side reinforcement portion 98 to provide further strength and rigidity to the side roof rail 30. The first gusset portion 122 is bonded to the first gusset portion 116 of the side reinforcement portion 98 by, for example, spot welding or other welding techniques. Similarly, the second gusset portion 124 is bonded to the second gusset portion 118 of the side reinforcement portion 98 by, for example, spot welding or other welding techniques. Together, the inner roof rail panel 96, the side reinforcement portion 98 and the side outer portion 100 form the side roof rail 30 of the roof support structure 12.

The center roof rail 32 is now described with respect to FIGS. 12, 13, 14, 15, 16 and 25. The center roof rail 32 is configured to support a mid-portion of a vehicle roof 14. The center roof rail 32 basically includes an upper surface 125, a first end 126, a central portion 128 and a second end 130. The first and second ends 126 and 130 each include a free end portion 131 and a mounting portion 132. Throughout most of its length, the center roof fail 32 has a generally U-shaped transverse cross-section. However, at the central portion 128, the width of the U-shaped transverse cross-section becomes wider, as shown in FIGS. 12 and 13. The mounting portion 132 is generally formed on a lower surface of the free end portion 131.

The center roof rail reinforcement member 34 is an elongated member shown in FIG. 13 whose sides conform generally to the shape of the center roof rail 32. Specifically, the center roof rail reinforcement member 34 is dimensioned to overly a majority of the upper surface 125 of the center roof rail 32. As shown in FIG. 15, the center roof rail reinforcement member 34 contacts outer edge portions of the upper surface 125 of the center roof rail 32. The center roof rail reinforcement member 34 is welded or otherwise fixedly attached to the center roof rail 32 providing structural strength and rigidity to the to the center roof rail 32.

The center roof rail reinforcement member 34 is primarily a flat plate-like member that is formed with several ribs that protrude outward from the center roof rail reinforcement member 34. However, the center roof rail reinforcement member 34 is slightly shorter than the center roof rail 32. Therefore, the free end portions 131 of the center roof rail 32 are exposed relative to the center roof rail reinforcement member 34. The vehicle roof is directly bond to the free end portions of the center roof rail 32.

The center roof rail brace(s) 36 is now described with respect to FIGS. 22, 23, 24, 25 and 26. The center roof rail brace 36 includes a first end 134, an arcuate portion 136, and a second end 138. The first end 134 includes a portion having a generally U-shaped transverse cross-section that conforms to the U-shaped transverse cross-section of the first end 126 (and second end 130) of the center roof rail 32. Specifically, the U-shaped transverse cross-section of the first end 134 is nested with the free end portion 131 of the center roof rail 32. The first end 134 includes an upper surface 140 that is directly bonded to the mounting portion 132 of the free end portion 131 of the first end 126 of the center roof rail 32 by, for example, spot welding or other welding techniques. Specifically, a portion of the center roof rail 32 overlies the upper surface 140 of the first end 134 of the center roof rail brace 36.

The arcuate portion 136 separates the first end 134 and second end 136 such that the first and second ends 134 and 136 are angularly offset from one another.

The second end 138 of the center roof rail brace 36 extends downwardly from the first end 134 of the center roof rail brace 36 and a generally flat end portion 142 formed at a distal end thereof. The flat end portion 142 of the second end 138 of the center roof rail brace 36 contacts and is bonded to the inward side 110 of generally planar central portion 104 of the inner side roof rail panel 96 by, for example, spot welding or other welding techniques. Further, as shown in FIG. 25, the inward side 110 is directly bonded to the flat end portion 142 of the second end 136 of the center roof rail brace 36 without direct contact or bonding to the center roof rail 32. As well, the center roof rail 32 has a length $L_1$ (FIG. 4) measured perpendicularly relative to the inner side roof rail panels 96 that is shorter than an overall transverse distance measured perpendicularly between the inner side roof rail panels 96 such that the opposite free ends (first and second ends 126 and 130) of the center roof rail 32 are spaced inwardly from the inner side roof rail panels 96.

The configuration and various attachments between the side roof rails 30, the center roof rail braces 36 and the center roof rail 32 provide the roof support structure 12 with rigidity and strength that is an improvement over conventional designs.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:
1. A vehicle roof structure comprising:
a center roof rail configured to support a mid-portion of a vehicle roof;
a center roof rail brace having first and second ends with the first end of the center roof rail brace being directly bonded to a free end portion of the center roof rail; and
an inner side roof rail panel configured to form a portion of a vehicle side roof rail on a first lateral side of the vehicle roof structure, the inner side roof rail panel having an upper longitudinal edge and a lower longitudinal edge, the second end of the center roof rail brace being directly bonded to an inboard side of the inner side roof rail panel between the upper longitudinal edge and the lower longitudinal edge of the inner side roof rail panel without bonding the center roof rail to the inner side roof rail panel, and with the second end of the center roof rail brace being spaced apart from both the upper longitudinal edge and the lower longitudinal edge of the inner side roof rail panel.

2. The vehicle roof structure according to claim 1, wherein
the first end of the center roof rail brace includes a portion having a generally U-shaped transverse cross-section.

3. The vehicle roof structure according to claim 1, wherein
the second end of the center roof rail brace extends downwardly from the first end of the center roof rail brace with a generally flat end portion formed at a distal end that contacts a generally planar portion of the inner side roof rail panel.

4. The vehicle roof structure according to claim 3, wherein
the generally flat end portion of the second end of the center roof rail brace is welded to the inner side roof rail panel and the first end of the center roof rail brace is welded to the center roof rail.

5. The vehicle roof structure according to claim 1, wherein
the first end of the center roof rail brace has an upper surface contacting and bonded to a mounting portion of the center roof rail, and the second end of the center roof rail brace is contacting and bonded to the inner side roof rail panel.

6. The vehicle roof structure according to claim 1, wherein
the center roof rail overlies an upper surface of the first end of the center roof rail brace.

7. The vehicle roof structure according to claim 1, further comprising
a reinforcement member overlying a majority of an upper surface of the center roof rail.

8. The vehicle roof structure according to claim 7, wherein
the reinforcement member is bonded to the center roof rail such that the free end portion of the center roof rail is spaced apart from the reinforcement member.

9. The vehicle roof structure according to claim 8, wherein
the center roof rail overlies an upper surface of the first end of the center roof rail brace.

10. The vehicle roof structure according to claim 9, wherein
the first end of the center roof rail brace includes a portion having a generally U-shaped transverse cross-section that is nested with the free end portion of the center roof rail, which has a generally U-shaped transverse cross-section.

11. The vehicle roof structure according to claim 8, wherein
the first end of the center roof rail brace has an upper surface contacting and bonded to a mounting portion of the center roof rail, and the second end of the center roof rail brace is contacting and bonded to the inner side roof rail panel.

12. The vehicle roof structure comprising:
a center roof rail configured to support a mid-portion of a vehicle roof;
a pair of center roof rail braces having first and second ends with the first end of the center roof rail braces being directly bonded to opposite free ends of the center roof rail; and
a pair of inner side roof rail panels each being configured to form a portion of a vehicle side roof rail on opposite lateral sides of the vehicle roof structure, and each having an upper longitudinal edge and a lower longitudinal edge, an inboard side of each of the inner side roof rail panels between the upper longitudinal edge and the lower longitudinal edge of the inner side roof rail panel being directly bonded to the second ends of the center roof rail braces, respectively, without bonding the center roof rail to the inner side roof rail panels, with the second ends of the center roof rail braces being spaced apart from both the upper longitudinal edge and the lower longitudinal edge of respective ones of the inner side roof rail panels.

13. The vehicle roof structure according to claim 12, further comprising
a reinforcement member overlying a majority of an upper surface of the center roof rail.

14. The vehicle roof structure according to claim 13, wherein
the reinforcement member is bonded to the center roof rail such that the opposite free ends of the center roof rail are spaced apart from the reinforcement member.

15. The vehicle roof structure according to claim 12, wherein
the first ends of the center roof rail braces include a portion having a generally U-shaped transverse cross-section that are nested with the opposite free ends of the center roof rail, which have generally U-shaped transverse cross-sections.

16. The vehicle roof structure according to claim 12, wherein
the center roof rail has a length measured perpendicularly relative to the inner side roof rail panels that is shorter than an overall transverse distance measured perpendicularly between the inner side roof rail panels such that the opposite free ends of the center roof rail are spaced inwardly from the inner side roof rail panels.

17. The vehicle roof structure according to claim 12, wherein
the center roof rail overlies an upper surface of each of the first ends of the center roof rail braces.

18. The vehicle roof structure according to claim 12, wherein
the first ends of the center roof rail braces have upper surfaces contacting and bonded to a mounting portion of a respective one of the center roof rail, and the second ends of the center roof rail braces are contacting and bonded to the respective one of the inner side roof rail panels.

19. The vehicle roof structure according to claim 18, wherein
the center roof rail has a length measured perpendicularly relative to the inner side roof rail panels that is shorter than an overall transverse distance measured perpendicularly between the inner side roof rail panels such that the opposite free ends of the center roof rail are spaced inwardly from the inner side roof rail panels.

20. The vehicle roof structure according to claim 19, further comprising
a reinforcement member bonded to an upper surface of the center roof rail such that the opposite free ends of the center roof rail are exposed relative to the reinforcement member.

21. The vehicle roof structure according to claim 1, wherein the first end of the center roof rail brace and the free end portion of the center roof rail have approximately equal widths.

22. The vehicle roof structure according to claim 12, wherein the first ends of the center roof rail brace and the free ends of the center roof rail have approximately equal widths.

* * * * *